(12) United States Patent
Leung et al.

(10) Patent No.: US 8,479,638 B2
(45) Date of Patent: Jul. 9, 2013

(54) TAMPING DEVICE

(75) Inventors: Chi Wah Leung, Hong Kong (CN); Shek Chuen Luk, Hong Kong (CN); Ka Po Wong, Hong Kong (CN)

(73) Assignee: Simatelex Manufactory Co., Ltd., Chaiwan, Hong Kong (CN)

( * ) Notice: Subject to any disclaimer, the term of this patent is extended or adjusted under 35 U.S.C. 154(b) by 487 days.

(21) Appl. No.: 12/713,496

(22) Filed: Feb. 26, 2010

(65) Prior Publication Data

US 2011/0209623 A1    Sep. 1, 2011

(51) Int. Cl.
*A47J 31/40*    (2006.01)

(52) U.S. Cl.
USPC ............................. 99/287; 99/302 R; 99/323

(58) Field of Classification Search
USPC ........................................ 99/287, 323, 302 R
See application file for complete search history.

(56) References Cited

U.S. PATENT DOCUMENTS

| | | | |
|---|---|---|---|
| 5,526,733 A * | 6/1996 | Klawuhn et al. ................ 99/287 |
| 8,051,766 B1 * | 11/2011 | Yu et al. .......................... 99/297 |
| 2004/0206243 A1 * | 10/2004 | Foster et al. .................... 99/279 |
| 2005/0132890 A1 * | 6/2005 | Constantine et al. ........... 99/275 |
| 2007/0132164 A1 * | 6/2007 | Petiziol .......................... 267/133 |
| 2007/0196551 A1 * | 8/2007 | Campetella et al. .......... 426/438 |

* cited by examiner

*Primary Examiner* — Benjamin Layno
(74) *Attorney, Agent, or Firm* — Leydig, Voit & Mayer, Ltd.

(57) ABSTRACT

A tamping device for applying a tamping force to ground coffee in a portafilter. The tamping device has a tamper and a guard. The tamper has a reciprocating tamping base. The guard defines a passageway through which the tamping base reciprocates. The passageway fits closely around the tamping base.

17 Claims, 11 Drawing Sheets

TAMPING DEVICE

The present invention relates to a coffee tamper. More particularly, although not exclusively, the invention relates to a coffee tamper in an arrangement that reduces spillage of coffee grounds during or after coffee tamping.

BACKGROUND OF THE INVENTION

In the coffee world, a tamper is used to compress grounds into an espresso machine's portafilter. This helps to create required pressure to allow more of the oils from the ground coffee to enter the cup, providing the intense flavor of espresso.

The preparation of espresso coffee involves running hot water through a compressed portion of coffee grounds in order to deliver a desired serving of concentrated espresso coffee.

It is well known in the art, the amount of compression of the coffee cake influences the quality of the beverage produced thereby.

The compression of the coffee grounds in the basket of the portafilter is known as tamping, and may be performed using a variety of tampers.

Types of espresso tampers known in the art include handheld manual tampers, fixed tamping surface typically mounted on coffee grinding machines, and large tamping machines which typically exert tamping forces by means of a lever actuated or mechanized plunger.

These tampers are generally solid ornamental objects configured with a lower surface adapted to allow the application of pressure on the coffee grounds in the filter basket, and an upper portion suitable for holding in the hand of the user. Following compression of the grounds, the handheld tamper is typically spun on the surface of the compressed grounds in order to form a smooth polished surface.

Large amount of loose grounded coffee has to be added to the portafilter so that after tamping, the portafilter is filled with compressed grounds. The amount of coffee grounds is determined by the tactile judgment of the user of the tamping device. It is therefore very difficult for even a skilled user to obtain precise amount of ground coffee using a conventional manual tamper. User tends to over fill the portafilter with coffee grounds. When tamping with a conventional tamper, loose grounds will fall off the portafilter causing quite a mess, this is particular the case for the less skillful.

Also, some coffee grounds adhere to the base of the tamper and wasted when the compression is completed with the tamper being removed. The amount of wasted grounds becomes more significant upon repeated application.

OBJECT OF THE INVENTION

It is an object of the present invention to overcome or substantially ameliorate at least one of the above disadvantages and/or more generally to provide a tamper which reduce wastage of ground coffee and to allow better control on the amount of ground coffee needed and the degree of tamping.

SUMMARY OF THE INVENTION

According to the invention, there is provided a tamping device for applying tamping force on ground coffee in a portafilter comprising a tamper having a tamping base capable of reciprocating movement, and a guard defining a passageway underneath the tamping base and through which the tamper reciprocates, wherein the passageway is in close fit around the tamping base.

Preferably, the tamping base reciprocates between first and second positions; a resilient biasing means is arranged to bias against movement of the tamping base to the first position.

More preferably, the guard is scaled for ascertaining desired amount of ground coffee.

Further more preferably, the tamper and the guard are connected by a connector.

Yet further more preferably, the connector is a moveable joint such that the tamper is at least partially removeable from the guard.

It is preferred that the connector is a hinge joint.

It is further preferred that the guard having a lower portion equipped with a coupling for securing the guard to the portafilter.

Preferably, the tamper has a handle and a cover positioned above the tamping base, between the handle and the cover defines a maximum moveable distance of the tamping base.

More preferably, the resilient biasing means is provided between the handle and the cover.

It is preferred that the resilient biasing means is a spring.

According to another aspect of the invention, there is provided a machine for preparing a beverage comprising a tamping device as defined above.

BRIEF DESCRIPTION OF DRAWINGS

A preferred form of the present invention will now be described by way of example only with reference to the accompanying drawings, in which.

DETAILED DESCRIPTION OF PREFERRED EMBODIMENT

Figure 1:
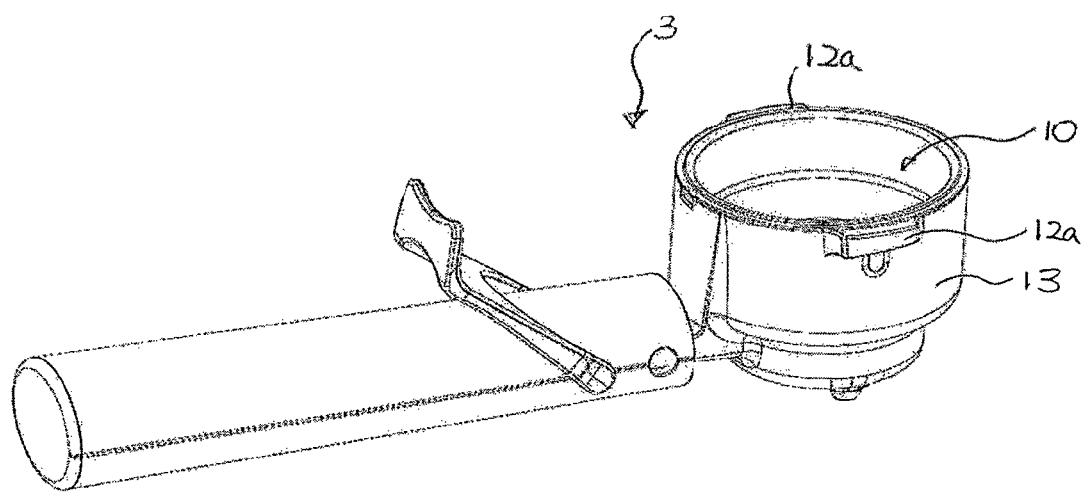
FIG. 1 is a drawing of a portafilter.
Figure 2:
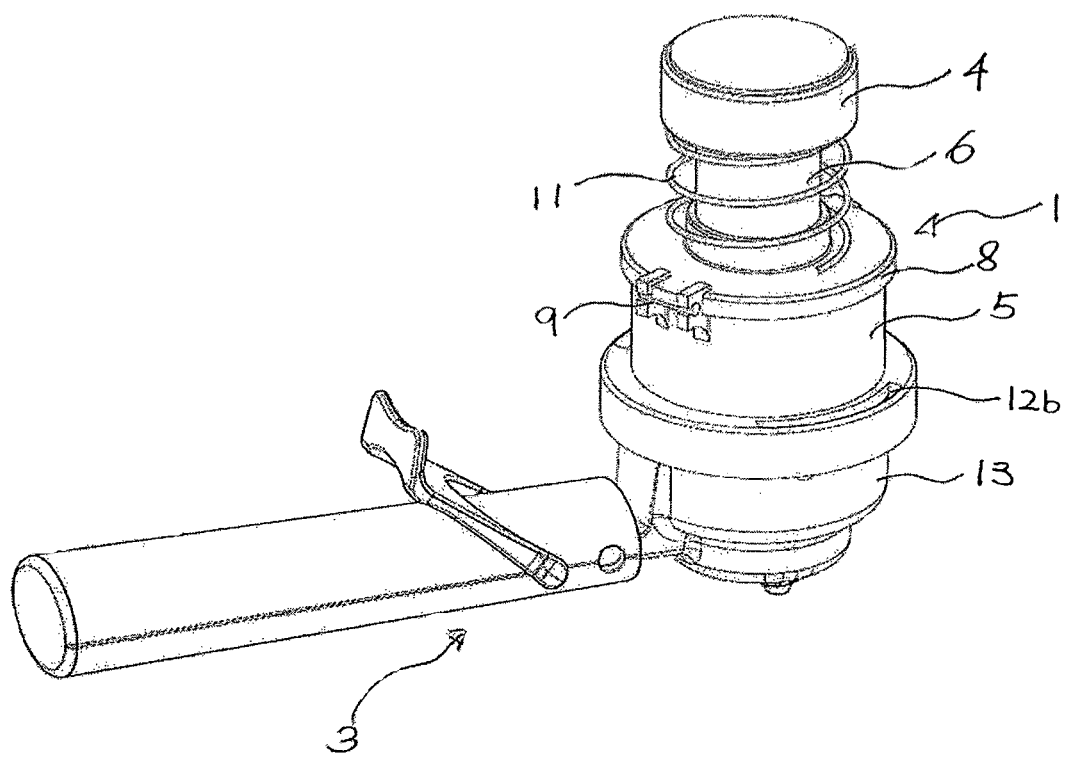
FIG. 2 is a drawing of a tamping device on the portafilter of FIG. 1.

Referring to FIGS. 1 to 11 of the drawings, there is shown an embodiment of a tamping device 1 in accordance with the invention which has a tamping base 2 for compressing coffee grounds in a portafilter 3, a shaft 6 above the tamping base 2, a handle 4 on upper end of the shaft 6 for application of tamping force by a user, and a guard 5 for defining a passageway underneath the tamping base 2 to confine the coffee grounds and to guide movement of the tamping base 2. The tamping base 2 is formed having an axial cross-sectional shape and size for fitting within the desired portafilter 3. Bottom 7 is adapted for contact with the surface of the coffee grounds during tamping. The tamping base 2, the shaft 6, the handle 4 and the bottom 7 are constructed using conventional techniques known in the art from materials suitable for imparting a tamping force to coffee grounds, and transferring a tamping force from the hand of the user. Preferably, such materials include wood, plastic, and metal such as stainless steel or aluminum.

Right above the tamping base 2, there is a cover 8. The shaft 6 runs through the cover 8 and ended with the handle 4. Between the cover 8 and the handle 4, there is a resilient biasing means 11, preferably a helical spring that runs along and round the periphery of the shaft 6. The tamping base 2 is capable of reciprocating axially between a first position, away from the portafilter, and a second position, towards the portafilter, through the passageway defined by the guard 5. The spring 11 abuts the cover 8 and biases against movement of the tamping base 2 towards the first position. When the user pushes the handle 4, the tamping base 2 is moved to the second position for exerting pressure onto the ground coffee in a basket 10 placed in a container 13 of the portafilter 3. When the user releases the handle 4, the tamping base 2 is moved to the first position relaxing the spring 11. The handle 4 and the cover 8 define a maximum moveable distance of the tamping base 2.

Figure 3:
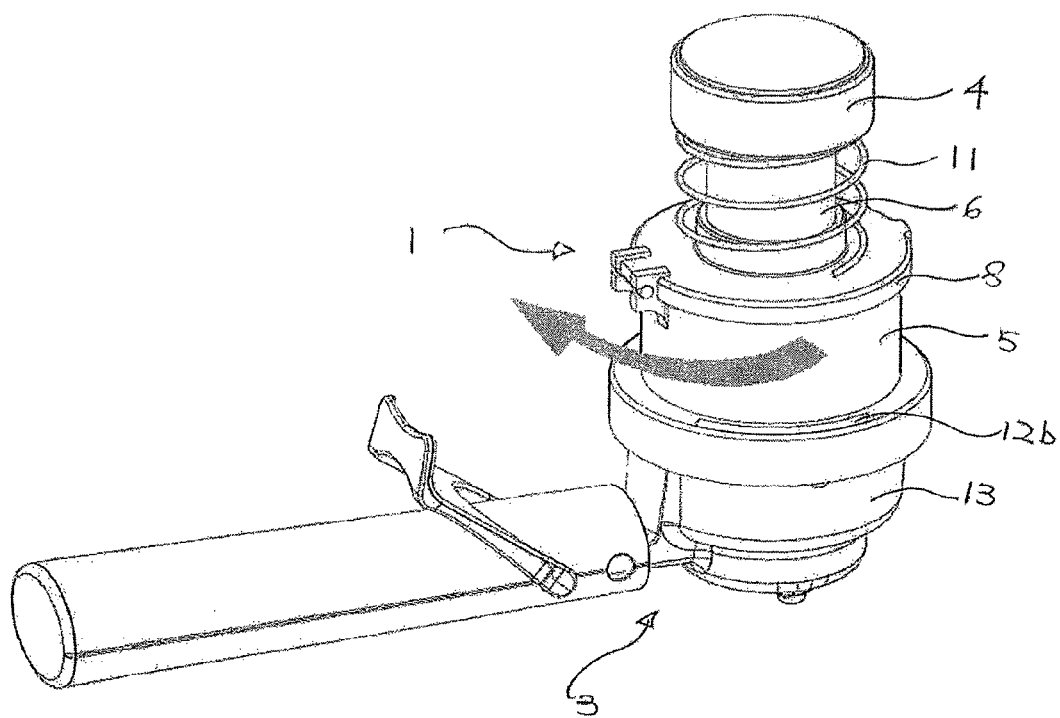
FIG. 3 is a drawing of the tamping device on the portafilter and a locking direction for locking the tamping device onto the portafilter.
Figure 10:
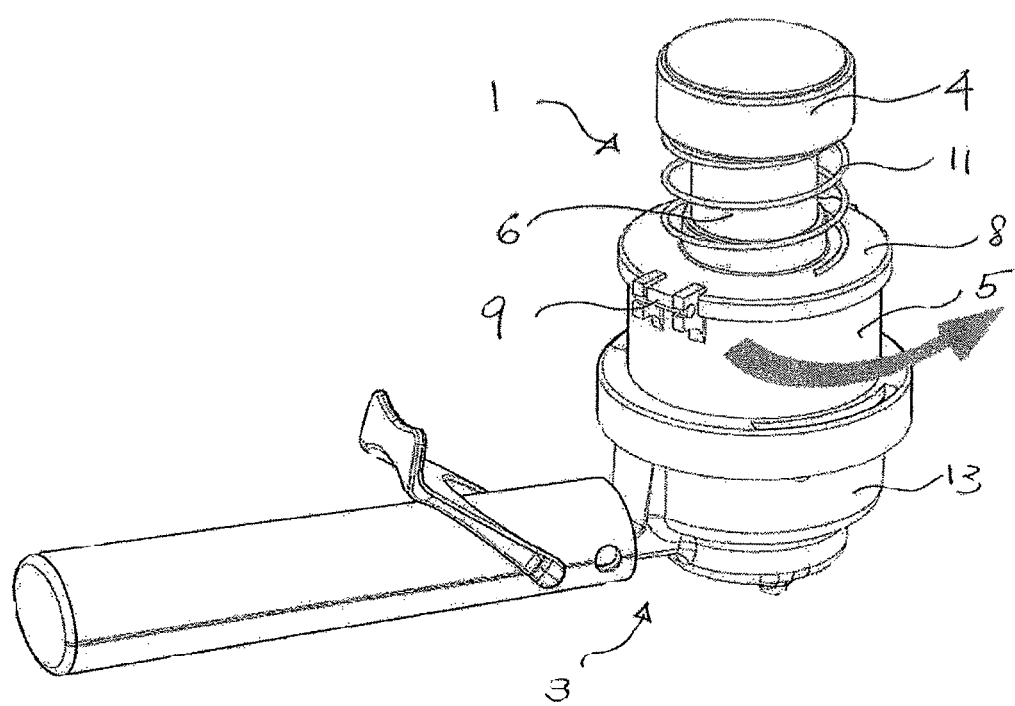
FIG. 10 is a drawing of the tamping device on the portafilter and an unlocking direction for unlocking the tamping device onto the portafilter.
Figure 11:
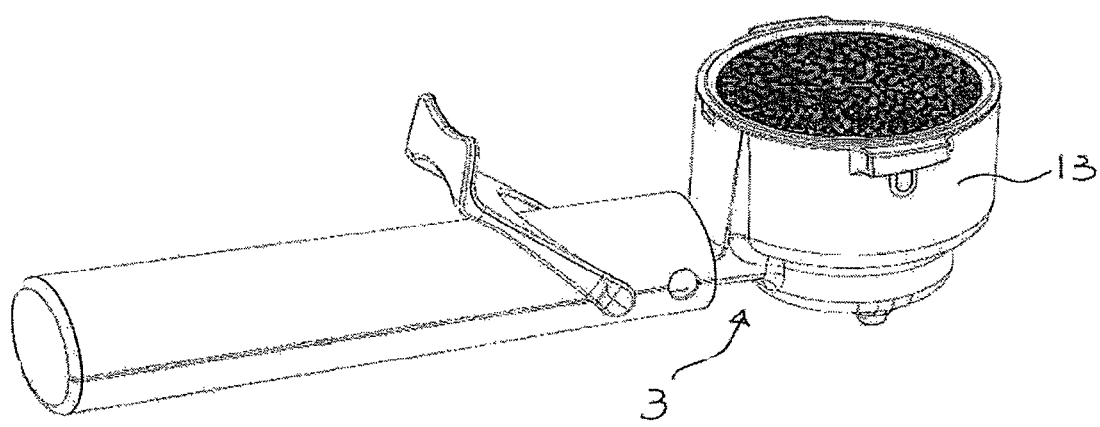
FIG. 11 is a drawing of the portafilter of FIG. 10 with the tamping device being removed.

The guard 5 is a passageway with open ends. The guard 5 is sized and shaped to fit over a basket 10 of the portafilter 3 at one end. The guard 5 is releasably connected to the portafilter 3 by at least two couplings 12a, 12b. Conventional portafilter 3 has at least two male couplings 12a provided on periphery of the container 13. At least two complementary female couplings 12b are provided adjacent the end on the periphery of the guard 5 to accommodate and lock onto the male couplings 12a. When the guard 5 is placed above the basket 10, the female couplings 12b each has a recess (not shown) for receiving the male couplings 12a. When the guard 5 is turned clockwise as shown in FIG. 3, the male couplings 12a are moved to the channel (not shown) defined by walls of the female couplings 12b. The male couplings 12a are retained in the channel of the female couplings 12b. The guard 5 is then locked onto the container 13. To release the guard 5 from the container 13, the guard 5 is turned anti-clockwise as shown in FIG. 10.

Figure 4:
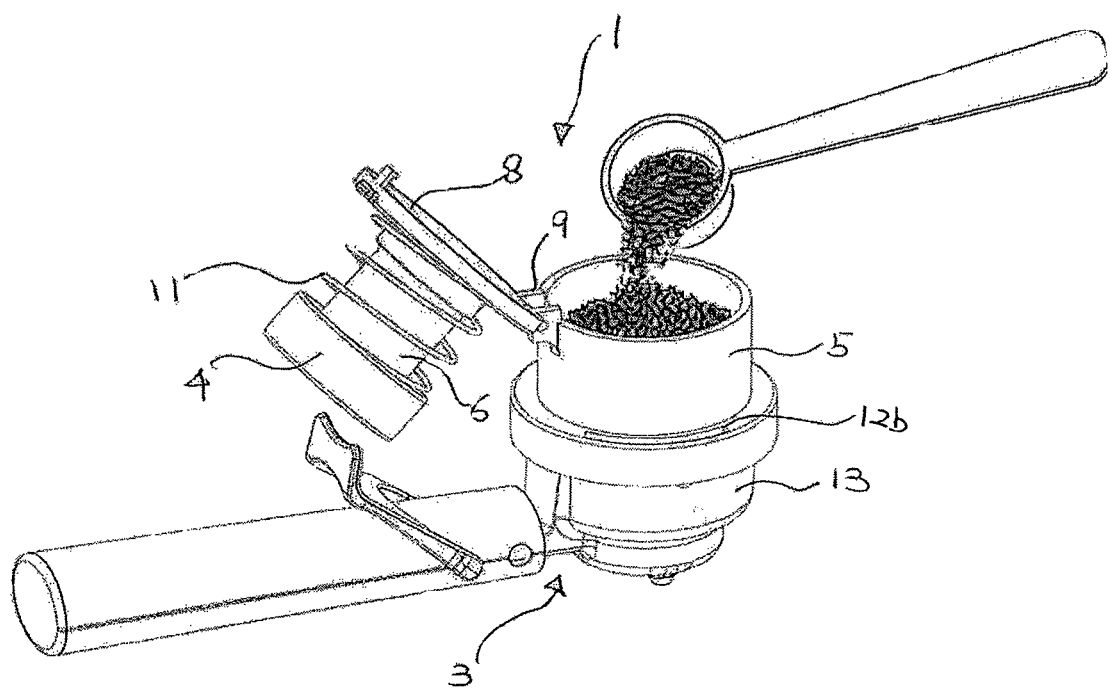
FIG. 4 is a drawing of the tamping device of FIGS. 2 and 3 being opened.
Figure 5:
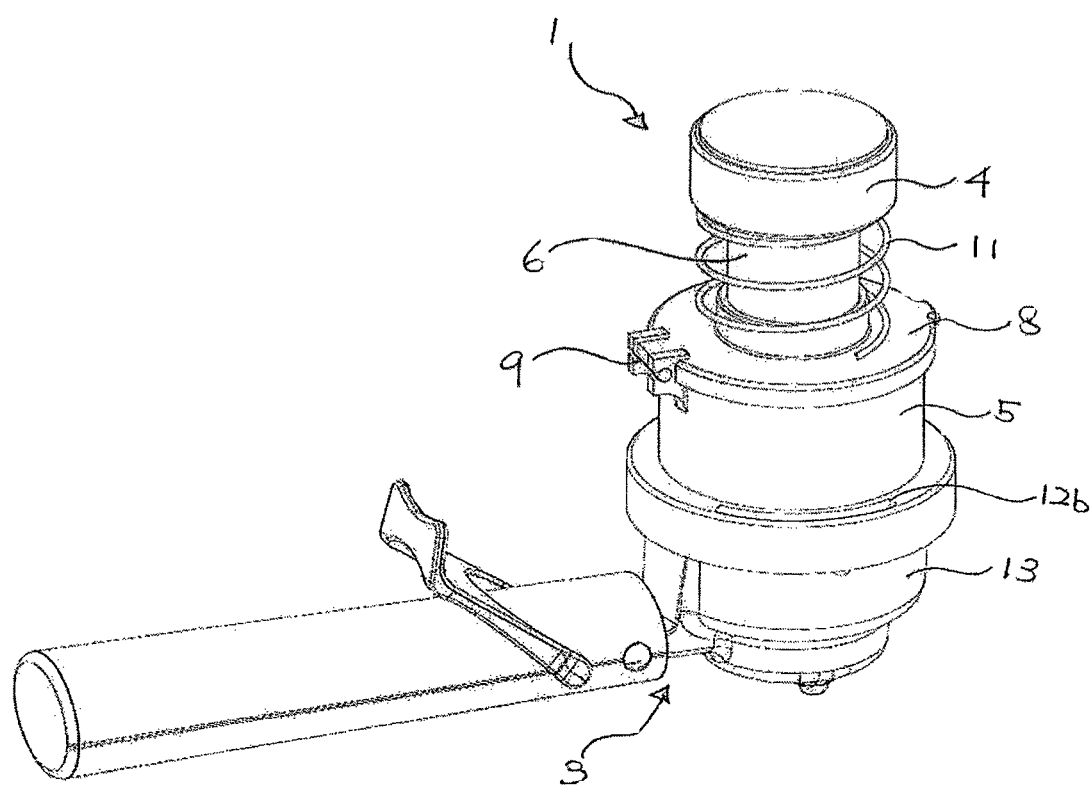
FIG. 5 is a drawing of the tamping device being closed.
Figure 6:
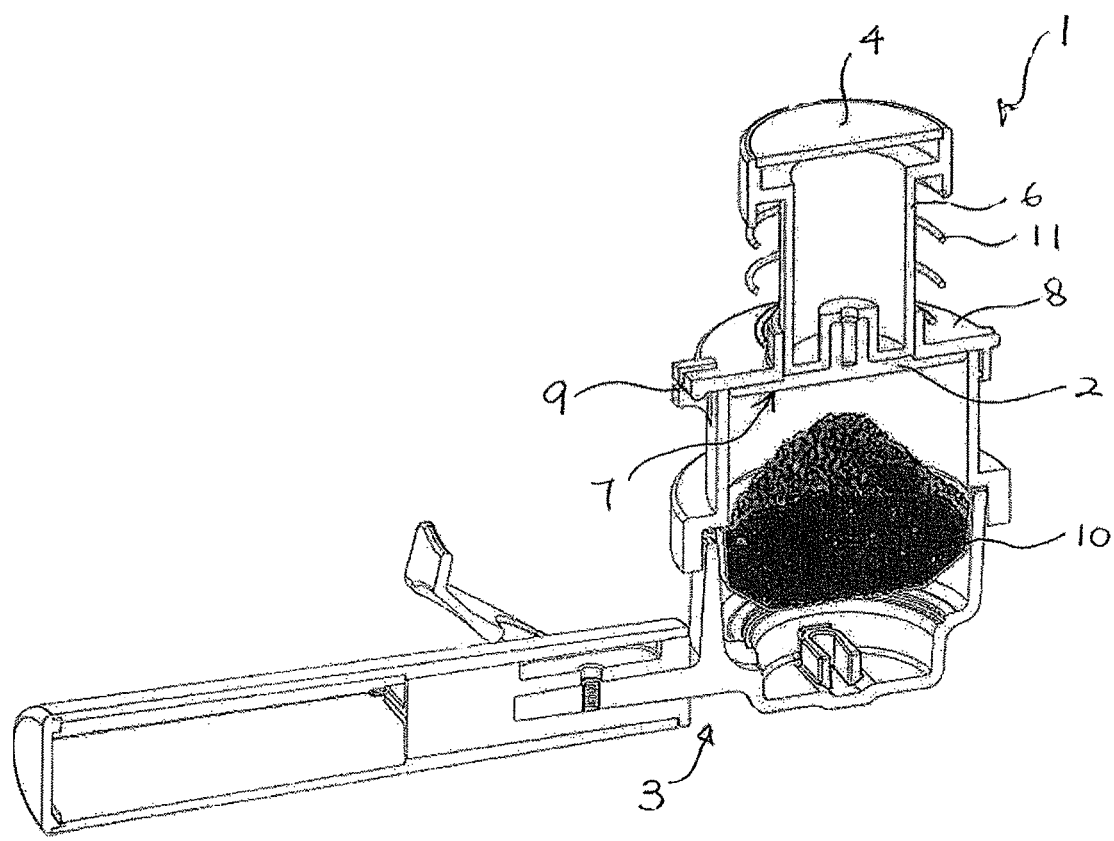
FIG. 6 is a cross-sectional drawing of the tamping device and the portafilter.
Figure 7:
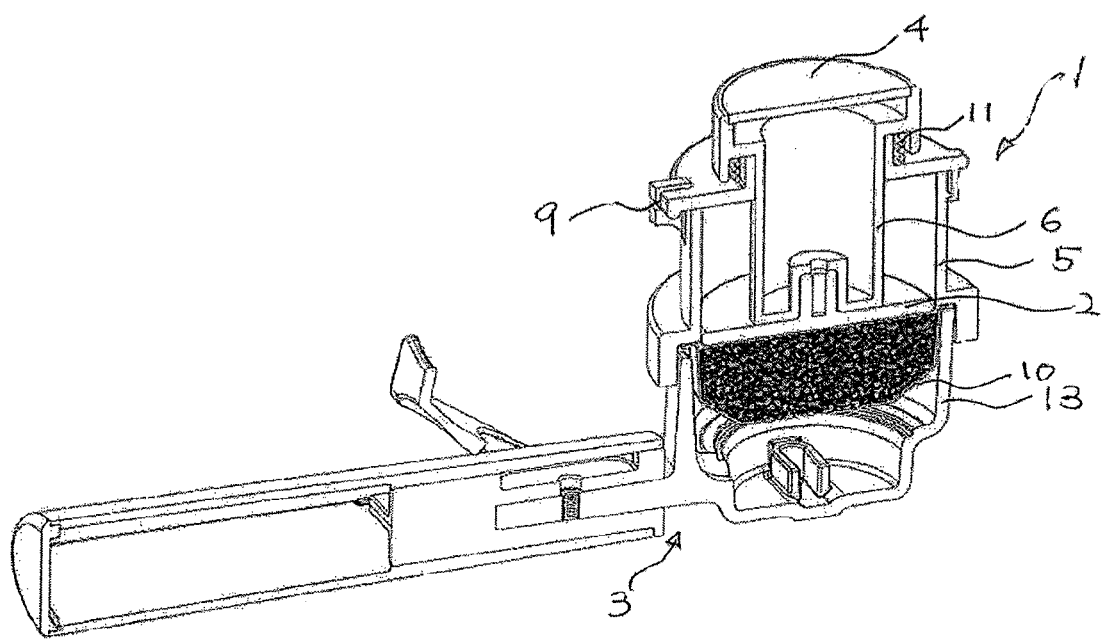
FIG. 7 is a cross-sectional drawing of the tamping device and the portafilter of FIG. 6 with the tamping device being compressed.
Figure 8:
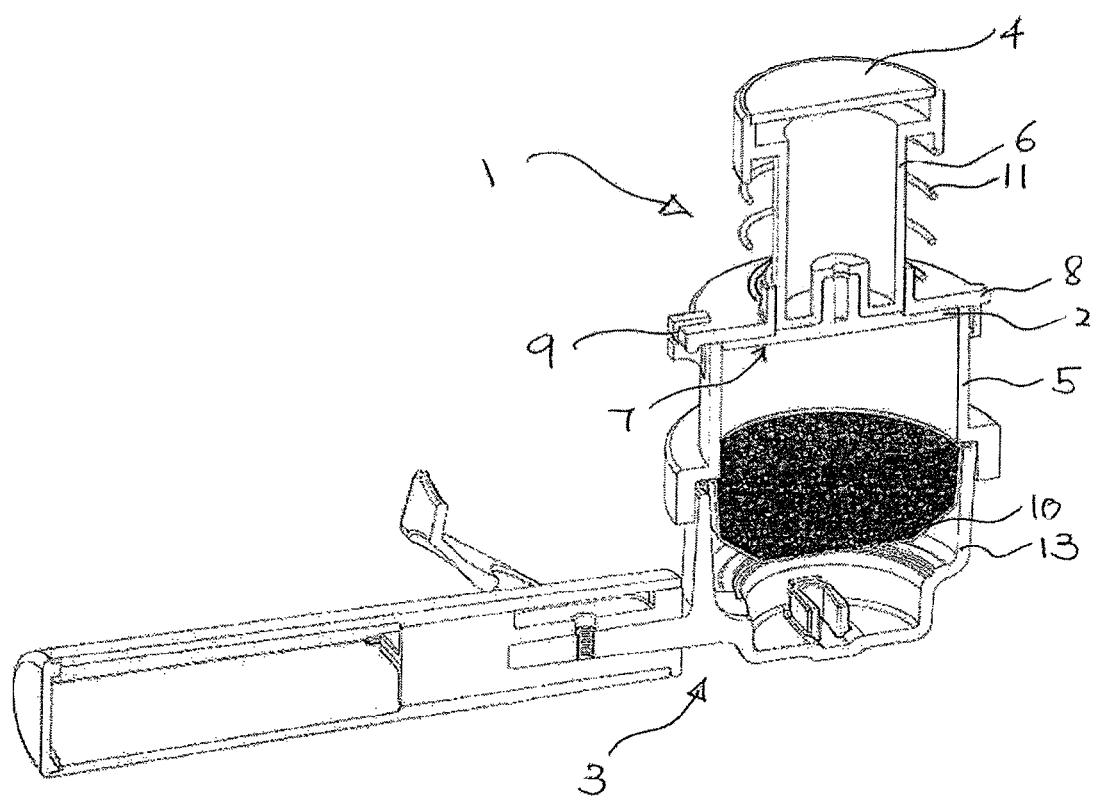
FIG. 8 is a cross-sectional drawing of the tamping device and the portafilter of FIG. 6 with the tamping device being released.
Figure 9:
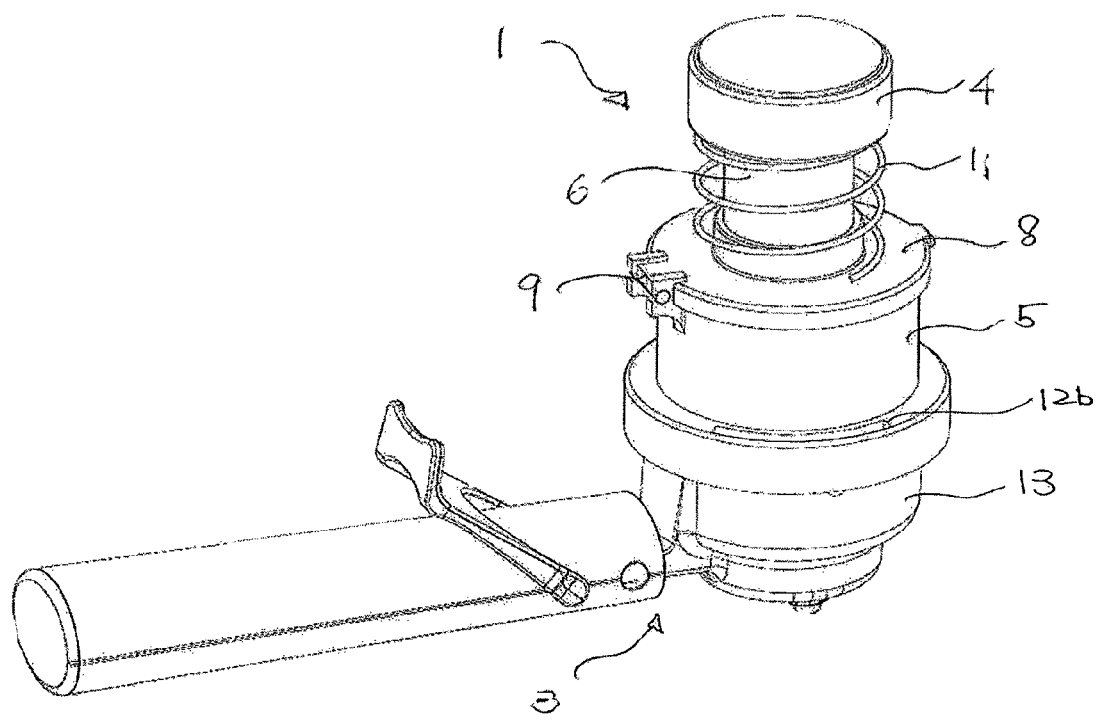
FIG. 9 is a drawing of the tamping device and the portafilter of FIG. 8.

At the other end of the guard 5, a joint 9, preferably, a hinge joint, connects the cover 8 to the guard 5. The cover 8 can be pivoted between open and close positions as shown in FIGS. 4 and 5. At the open position, the tamping base 2 is removed from the basket 10 of the portafilter 3. Ground coffee can be inserted into the basket 10. When the cover 8 is closed, the tamping base 2 is positioned above and aligned with the basket 10 ready for tamping the ground coffee in the basket 10. The cover 8 has a slightly larger diameter as compared to that of the guard 5.

The passageway is in close fit around the tamping base 2 to prevent loose grounds from traveling back to the passageway when the tamping base 2 is pushed downwards.

The bottom 7 of the tamping base 2 is substantially flat such that the pressure exerted by the tamper on the coffee ground in the portafilter 3 is fairly even.

As mentioned, the amount of ground coffee required is different for grounded coffee of different dimension. To obtain the right amount of grounded coffee, the guard 5 has grid lines showing the amount of grounded coffee required for a particular grounded coffee dimension. This is particularly useful when the guard 5 is attached to the basket 10 blocking the vision of the user.

The connection of the guard 5 to the container 13 does not affect the open and close of the cover 8.

Optionally, the above described tamping device 1 may be provided as part of a larger machine.

To use the tamping device 1, the guard 5 is first secured onto the portafilter 3 by matching the male couplings 12a with the recess of the female couplings 12b and by turning the guard 5 clockwise thereafter. The cover 8 may then be opened for insertion of ground coffee into the basket 10 in the container 13 through the guard 5. When the required amount of ground coffee, determinable by the grid lines on the guard 5, has been added, the cover 8 is closed. By closing the cover 8, the tamping base 2 is placed above and in alignment with the basket 10. The user may now press the handle downwards to compress the inserted coffee grounds.

In case more ground coffee is required, the cover 8 can be reopened for ground coffee adding.

When the ground coffee is tamped to the desired degree of compression, the tamping device 1 can be removed by turning the guard 5 anti-clockwise to release the couplings 12a, 12b.

As will be obvious to one skilled in the art, numerous variations and modifications can be made to the embodiment discloses above without departing from the spirit of the present invention. Therefore, it should be clearly understood that the form of the present invention described in the embodiments detailed above and shown in the accompanying Figures is illustrative only and is not intended to limit the scope of the present invention.

The invention claimed is:

1. A tamping device for applying a tamping force to ground coffee in a portafilter, the tamping device comprising:
    a tubular guard having a central axis, opposed first and second ends, a tube forming a passageway extending from the first end to the second end, and grid lines on the tube for indicating respective volumes of coffee required depending on coffee grind;
    a tamper having opposed first and second ends, a shaft extending from the first end to the second end, and a tamping base at the second end, wherein the shaft and the tamping base reciprocate within the passageway for tamping coffee in the tube and in a basket attached at the second end of the tubular guard; and
    a cover and a hinge attaching the cover to the first end of the tubular guard so that the cover, in a closed position, covers the first end of the tubular guard, and, in an open position, exposes an inside surface of the tube, wherein the cover has an aperture through which the shaft of the tamper reciprocates,
    the passageway fits closely around the tamping base, and the grid lines can be viewed only when the cover is in the open position.

2. The tamping device as claimed in claim 1, wherein the tamping base reciprocates between first and second positions in the passageway, respectively remote from and proximate to a portafilter attached at the second end of the tubular guard, and further comprising resilient biasing means biasing the tamping base toward the cover.

3. The tamping device as claimed in claim 2, wherein the resilient biasing means is a spring.

4. The tamping device as claimed in claim 1, including a coupling at the second end of the tubular guard for securing the second end of the tubular guard to the basket.

5. The tamping device as claimed in claim 1, wherein
    the tamper includes a handle at the first end of the tamper, and spacing between the handle and the cover defines a maximum moveable distance of the tamping base.

6. The tamping device as claimed in claim 5, wherein the tamping base reciprocates between first and second positions in the passageway, respectively remote from and proximate to a basket attached at the second end of the tubular guard, and further comprising resilient biasing means biasing the tamping base toward the cover.

7. The tamping device as claimed in claim 6, wherein the resilient biasing means is located between the handle and the cover.

8. The tamping device as claimed in claim 7, wherein the resilient biasing means is a spring.

9. The tamping device as claimed in claim 1, wherein the hinge has an axis of rotation transverse to the central axis of the tubular guard.

10. A tamping device for applying a tamping force to ground coffee in a basket, the tamping device comprising:
- a tubular guard having a central axis, opposed first and second ends, and a tube forming a passageway extending from the first end to the second end;
- a tamper having opposed first and second ends, a shaft extending from the first end to the second end, and a tamping base at the second end, wherein the shaft and the tamping base reciprocate within the passageway for tamping coffee in the tube and in a basket attached to the second end of the tubular guard; and
- a cover and a hinge attaching the cover to the first end of the tubular guard so that the cover, in a closed position, covers the first end of the tubular guard, and, in an open position, exposes an inside surface of the tube, wherein the cover has an aperture through which the shaft of the tamper reciprocates, the passageway fits closely around the tamping base, and the hinge has an axis of rotation transverse to the central axis of the tubular guard.

11. The tamping device as claimed in claim 10, wherein the tamping base reciprocates between first and second positions in the passageway, respectively remote from and proximate to a basket attached at the second end of the tubular guard, and further comprising resilient biasing means biasing the tamping base toward the cover.

12. The tamping device as claimed in claim 11, wherein the resilient biasing means is a spring.

13. The tamping device as claimed in claim 10, including a coupling at the second end of the tubular guard for securing the second end of the tubular guard to the basket.

14. The tamping device as claimed in claim 10, wherein
the tamper includes a handle at the first end of the tamper, and spacing between the handle and the cover defines a maximum moveable distance of the tamping base.

15. The tamping device as claimed in claim 14, wherein the tamping base reciprocates between first and second positions in the passageway, respectively remote from and proximate to a basket attached at the second end of the tubular guard, and further comprising resilient biasing means biasing the tamping base toward the cover.

16. The tamping device as claimed in claim 15, wherein the resilient biasing means is located between the handle and the cover.

17. The tamping device as claimed in claim 16, wherein the resilient biasing means is a spring.

* * * * *